United States Patent [19]

Alexander

[11] Patent Number: 5,773,529
[45] Date of Patent: Jun. 30, 1998

[54] METHOD AND APPARATUS WHICH REMOVES ODOR AND POLLUTANTS WHEN PREPARING CULLET FOR USE IN AN ELECTROSTATIC BED FILTER

[75] Inventor: Jeffrey C. Alexander, Kent, United Kingdom

[73] Assignee: Sandvik AB, Sandviken, Sweden

[21] Appl. No.: 719,516

[22] Filed: Sep. 25, 1996

Related U.S. Application Data

[62] Division of Ser. No. 570,984, Dec. 12, 1995.
[51] Int. Cl.$^6$ .................................................. C03B 3/02
[52] U.S. Cl. ............................. 65/168; 65/335; 34/169; 34/218; 34/219
[58] Field of Search ..................... 65/168, 335; 34/589, 34/79, 169, 218, 219

[56] References Cited

U.S. PATENT DOCUMENTS

| | | | |
|---|---|---|---|
| 3,728,094 | 4/1973 | Bowman | 65/27 |
| 4,144,359 | 3/1979 | Zahedi et al. | 427/39 |
| 4,149,858 | 4/1979 | Noack et al. | 55/73 |
| 4,225,332 | 9/1980 | Tsay | 65/134 |
| 4,306,899 | 12/1981 | Richards | 65/134 |
| 4,308,036 | 12/1981 | Zahedi et al. | 55/6 |
| 4,338,112 | 7/1982 | Propster | 65/27 |
| 4,338,113 | 7/1982 | Hohman et al. | 65/27 |
| 4,349,367 | 9/1982 | Krumwiede | 65/27 |
| 4,350,512 | 9/1982 | Krumwiede | 65/27 |
| 4,374,652 | 2/1983 | Zahedi et al. | 55/6 |
| 4,410,347 | 10/1983 | Krumwiede | 65/27 |
| 4,505,723 | 3/1985 | Zahedi et al. | 55/117 |
| 4,542,000 | 9/1985 | Alexander et al. | 423/244 |
| 4,668,489 | 5/1987 | Alexander et al. | 423/240 |
| 4,940,478 | 7/1990 | Naber et al. | 65/27 |
| 5,243,621 | 9/1993 | McNeill | 373/33 |
| 5,290,334 | 3/1994 | Alexander | 65/335 |
| 5,342,427 | 8/1994 | Alexander | 65/27 |
| 5,347,938 | 9/1994 | Takazawa | 110/346 |

FOREIGN PATENT DOCUMENTS 2038200 7/1980 United Kingdom.

OTHER PUBLICATIONS

Miller et al., "Batch Pretreatment Process Technology . . . ", U.S. Environmental Protection Agency Report No. EPA/600/2–85/073, National Technical Information Service, Jun. 1995.
Larsson, ", Particulate emission control and raw material preheating"Edmeston AB, Summer, 1992.
"Cullet Preheating System. The compact Addition For All Glass Melters Using Cullet", SORG GMBY & Co., Available prior to Sep. 21, 1992.
"Installations For the Glass Industry", GEA Energietechink GmbH, Available prior to Sep. 21, 1992.
"Cullet Preheating", SORG GmbH & Co., Available prior to Sep. 21, 1992.
"Economics of Cullet Preheating", Bernd–Holger Zipper, Glass International, Jun., 1992.
"The Edmeston Emission Control System", EdmestonGmgH, published before Sep. 21, 1991.

Primary Examiner—Donald E. Czaja
Assistant Examiner—Sean Vincent
Attorney, Agent, or Firm—Burns, Doane, Swecker & Mathis, L.L.P.

[57] ABSTRACT

A method and apparatus for treating cullet before use as a raw material in a glass manufacturing process is disclosed. The method includes providing a bed of cullet; passing hot gases through the bed, the quantity and temperature of gases being sufficient to pyrolyze odor creating impurities within the bed of cullet; entraining volatile products of pyrolysis into gases leaving the moving bed; heating the gases leaving the bed to oxidize odor creating impurities; and discharging the gases to the atmosphere. The apparatus includes a housing containing a moving bed of cullet; a source of hot gases which permits the gases to pass through the moving bed of cullet to pyrolyze odor creating impurities within the cullet and entrain volatile products of pyrolysis into gases leaving the moving bed; and an incinerator to remove odor creating impurities from gases leaving the moving bed.

5 Claims, 6 Drawing Sheets

METHOD AND APPARATUS WHICH REMOVES ODOR AND POLLUTANTS WHEN PREPARING CULLET FOR USE IN AN ELECTROSTATIC BED FILTER

This application is a division of application Ser. No. 08/570,984, filed Dec. 12, 1995.

BACKGROUND OF THE INVENTION

1. Field of the Invention

The present invention lies in the art of glass manufacture. More particularly, the invention concerns the processing of cullet which is fed to a glass melting furnace along with other raw materials. In particular, the invention is directed to a method and apparatus which removes odor and pollutants when preparing cullet for use in an electrostatic bed filter.

2. Description of the Prior Art

Glass manufacture involves the mixing of various batch ingredients, generally including silica sand, dry powders, granular oxides, carbonates, and other raw materials (depending on the desired glass type) and heating them to a temperature of about 1500° C. where they become molten and acquire a homogeneous nature. Substantial quantities of heat are required for the melting process, generally supplied by combustion of fossil fuels. Because of the relatively poor heat transfer from the hot combustion gases to the pool of molten glass, exhaust gas temperatures from the process are usually quite high in spite of various types of heat recovery equipment employed. As well, pollutants of various types are emitted from the melting process along with the exhaust gases.

Cullet, that is, broken pieces of glass, is added to the other batch ingredients and charged to the melting furnace. A certain minimum proportion of the total batch is required to be cullet in order to provide proper melting characteristics, generally in the range of 10–20% by weight. Cullet normally used for this purpose is generated within the glass factory, either from product breakage during the manufacturing process, or from dumping of molten glass during product changes.

Recent emphasis on waste recycling has resulted in the collection of large quantities of what is called ecological cullet. This is generally glass bottles returned to recycling centers. With proper processing such as sorting by color, removing foreign substances and crushing to smaller sized pieces, ecological cullet can be made suitable for remelting into new glass. Currently there are a number of glass factories set up with glass melting furnaces where some 80–90% of the batch feed material is ecological cullet.

When used in these quantities, the possibility of preheating cullet with waste exhaust gases from the furnace becomes economically attractive and equipment for such purpose is commercially available. See, Zippe, "Economics of Cullet Preheating", Glass International June 1992.

One such type of equipment potentially useful in this role is an electrostatic granular bed filter. Electrostatic granular bed filters employ a bed of electrically charged granules. Exhaust gases containing particulate pollution are electrostatically charged and contacted with the granular bed. The electrostatically charged particles in the exhaust gases are attracted to and retained on the electrically charged granular bed.

U.S. Pat. No. 4,338,112, incorporated herein by reference, discloses methods for utilizing electrostatic granular bed filter technology for air pollution reduction from glass furnaces. However, this patent provides no teaching of a workable system for replacing the granules in the electrostatic granular bed filter with cullet.

The simple substitution of cullet for the widely used silica-based granules in an electrostatic granular bed filter results in several operational problems which render the system ineffective and inoperative. First, cullet is generally wet either from washing in the waste recycling process or from storage in open outside locations. Wet granules in an electrostatic granular bed filter would present an electrical short circuit and prevent the application of substantial voltages to the bed.

Second, the heat transfer resulting from direct contact of the hot exhaust gases and the cullet is quite good. As a result, the exhaust gases are very effectively cooled by the cold cullet as it is first contacted by the gases. Continued heat transfer cools the gases to below their acid dew point temperature, at which point an acid mist would be formed which would in turn result in excessive equipment corrosion.

Third, as cullet is handled mechanically, the glass is subject to breakage and formation of substantial quantities of fine glass dust. When exhaust gases are passed through the cullet in the electrostatic granular bed filter, this glass dust would become entrained in the gases and exit the filter as dust emissions.

U.S. Pat. No. 5,342,427, incorporated herein by reference, discloses an apparatus and methods for simultaneously preheating cullet and removing pollutants from glass furnace gases. Raw moist cullet having fine glass dust material and often impurities adhered to its surface is heated by furnace gases which remove the moisture and the impurities by entrainment. The dry, clean cullet is then electrically charged and used to filter the exhaust gases which have been electrostatically charged.

It is especially attractive to utilize this process in cases where the glass manufacturing process is receiving large amounts of cullet from recycling efforts in the community. This recycled cullet is often contaminated with a wide range of materials such as organic residues in bottles, paper, and other non-glass waste materials mistakenly deposited into recycled containers.

In the case where raw cullet used in the process is contaminated with these materials, it has been found that the process described in U.S. Pat. No. 5,342,427 produces objectionable odors which are discharged to the atmosphere. Apparently, when the organic residues and other contaminates are heated, the contaminates are sometimes volatilized and discharged to the atmosphere. Hence, there remains a need in the art for a method and apparatus which removes odor caused by volatilization of these pollutants when preparing cullet for use in an electrostatic bed filter.

SUMMARY OF THE INVENTION

It is accordingly an object of the invention to provide a method and apparatus for the preheating of cullet prior to feeding the cullet to a glass furnace.

It is another object of the invention to provide a method and apparatus, as above, which simultaneously provides for reducing particulate pollution emissions from glass furnace exhaust gases.

It is yet another object of the invention to provide a method and apparatus, as above, which renders the cullet suitable for use as a bed in an electrostatic filter.

It is even a further object of the present invention to remove odor and pollutants when preparing cullet for use in an electrostatic bed filter.

These objects are achieved by a method which includes the steps of providing a moving bed of cullet, passing hot gases through the bed, the quantity and temperature of the gases being sufficient to pyrolyze odor creating impurities within the bed of cullet; entraining volatile products of pyrolysis into gases leaving the moving bed; raising the temperature of the gases leaving the bed to oxidize odor creating impurities; and discharging the gases to the atmosphere.

The method for removing odor and pollutants when preparing cullet for use in an electrostatic bed filter may be accomplished by use of the apparatus of the present invention. The apparatus includes a housing containing a moving bed of cullet; a source of hot gases which permits the gases to pass through the bed and pyrolyze odor creating impurities in the housing; an outlet for removing gases containing the impurities; and a heater to raise the temperature of the gases which have been removed from the container such that the impurities are oxidized to remove the odor.

In one embodiment of the invention, there is provided a method for reducing particulate pollution emissions from glass furnace exhaust gases. The method includes providing a first confinement for a first moving bed of raw cullet having impurities adhered to its surface, including moisture and fine glass dust. A first flow of hot glass furnace exhaust gases is passed through the moving bed such that at least a portion of odor causing impurities are pyrolyzed and entrained in the exhaust gases passing through the first moving bed. The exhaust gases containing odor causing impurities entrained therein are removed and incinerated to eliminate odor and other undesirable components. A second confinement for a second moving bed is provided with a cleaned, preheated electrically polarized second moving bed of cullet from the first moving bed. A second flow of exhaust gases, not having been passed over the first moving bed is charged and passed through the second moving bed depositing at least a portion of electrostatically ionized particulate pollution and dust material in the exhaust gases onto the second bed.

BRIEF DESCRIPTION OF THE DRAWINGS

For a full understanding of the invention, the following detailed description should be read in conjunction with the drawings, wherein.

DETAILED DESCRIPTION OF THE PREFERRED EMBODIMENTS

The present invention provides a solution to the problems of providing clean, preheated cullet, removing pollutants and removing odor caused by preheating cullet. cullet can be delivered to the apparatus of the invention wet, loaded with glass dust fine material, and at ambient temperatures (about 20° C.). One of the aspects of the invention is the unique combination of preconditioning steps with an effective filter design which remove pollutants and odor from glass furnace exhaust gases.

Figure 1:
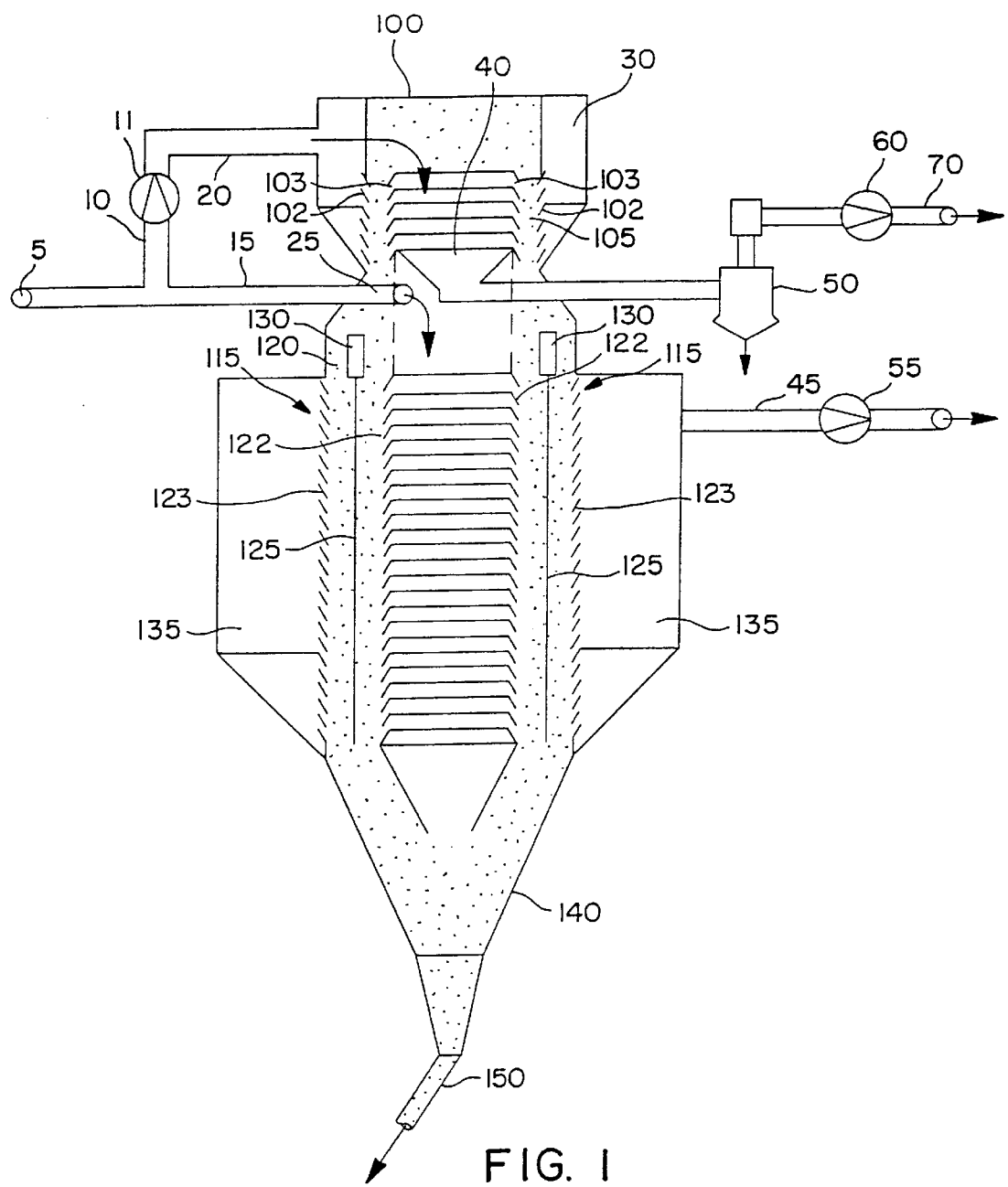
FIG. 1 illustrates a vertically downward moving cullet bed with two horizontal gas flows therethrough.

The preconditioning steps employ a moving bed of cullet sufficiently thin coupled with gas flow at high enough velocity that cooling of the exhaust gases to their acid dew point does not occur. Since the cullet bed is not required to be a filter, it does not matter if the cullet is wet, and the cullet will be dried by the hot gas, Also, the high gas velocity in the bed serves to remove the glass dust material, freed during drying of the cullet by blowing it out of the bed. Further, the vertical height of the preconditioning bed is chosen so that the cullet is heated to a temperature above the acid dew point of the gas, so that its subsequent use in an electrostatic filtration bed is allowed. The cullet flows from the preconditioning bed to a filtration bed in a gentle fashion, In this regard, the preconditioning bed and the filtration bed are advantageously contiguous so that there is no free fall impact onto hard surfaces, and no further glass dust formation takes place, FIG. 1 illustrates a preferred embodiment of the apparatus of the invention. The apparatus is a cylindrically symmetric module, but other shapes can be used depending on the specific application, Hot exhaust gases 5 are introduced into the module through lines 10 and 15 at two locations 20 and 25.

Cullet fills the preconditioning bed 105 through inlet hopper 100. The preconditioning bed 105 is a confinement formed by concentric conduits having apertures or slots therein, for example, outer louvers 102 and inner louvers 103.

Hot exhaust gases, typically about 400°–500° C., are drawn from a main flow of gases 5 through line 10 by dryer/pyrolyzer supply fan 11 and are discharged into a dryer/pyrolyzer 30 through inlet 20 where they pass through the first preconditioning bed of raw cullet, An internal plenum 40 collects these gases, which are cooled as a result of contact with the raw cullet, and carries the gases outside of the dryer/pyrolyzer 30. These gases carry a substantial quantity of fine glass dust which is entrained, so the gases are directed to a cyclone collector 50, which captures the fine glass dust. These gases are drawn from the dryer/pyrolyzer 30 through the cyclone collector 50 by fume fan 60. The dryer/pyrolyzer 30 performs the functions of drying the cullet, removing glass dust and partially heating cullet before subsequent usage of the cullet as a filter for removing pollutants from exhaust gases introduced into the module of inlet 25.

It has also been discovered that essentially all of the odor producing substances can be pyrolyzed in the dryer/pyrolyzer 30 as the cullet is heated from ambient temperature (typically 20° C.) up to some elevated temperature. This temperature will depend somewhat upon is the specific substances which must be pyrolyzed, but is typically in the range of 150°–250° C. The volatile products of the pyrolysis are entrained in the gases flowing through the dryer/pyrolyzer 30. In the prior process described in U.S. Pat. No. 5,342,427, these gases are mixed back into the main gas flow, pass through the main filter module, and are discharged to the atmosphere. In the present invention, the pyrolyzed gases containing odor causing substances are desirably kept separate from the main gas flow introduced into the module at inlet 25.

The gas velocity and thickness of the first moving bed of cullet are chosen so that the exhaust gases are not cooled to below their acid dew point. The actual acid dew point is of course a function of the acid composition in the exhaust gases. In general, the acid dew point is about 150° C., but may vary from 100°–190° C. Generally, the gas velocity falls in the range of 0.5 to 3.0 m/sec, usually, 1.0 to 2.5 m/sec and is typically in the range of 1.5 to 2.0 m/sec. The bed thickness is generally between about 50 and 300 mm, typically between about 100 and 200 mm.

Fans 11 and 60 control the volume of gases which are drawn through the dryer/pyrolyzer 30 and in this way, the gas velocity in the preconditioning bed 105 can be controlled. This is important because excessive velocity in the preconditioning bed 105 would cause larger cullet pieces to be blown out of the bed, while too low of velocity would not effectively blow out the fines and/or would result in the exhaust gases being cooled below their acid dew point.

The vertical height of the preconditioning bed 15 is chosen so that the cullet will be adequately preheated to above the gas acid dew point so that the cullet can be subsequently used in the electrostatic cullet bed filter 115 and to above the temperature required to pyrolyze the odor causing impurities from the cullet. This is accomplished by providing a cullet bed flow velocity and cullet bed height such that adequate residence time of cullet in the preconditioning bed 105 is achieved. Generally the cullet residence time is between 1 and 50 minutes, desirably between 5 and 30 minutes and preferably between 10 and 20 minutes.

Hot exhaust gases which are to be purified to remove pollutants may also enter the module at inlet 25 through line 15. These gases are directed past an ionizer discharge cathode electrode (not shown). The ionizer discharge cathode electrode is desirably positioned above the electrostatic cullet bed filter 115 but may also be positioned external to the module, e.g., in line 15. The cathode electrode is connected to a high voltage DC power supply and forms a corona discharge. As exhaust gases pass the electrode, the entrained pollutant dust particles are given an electrostatic charge. An example of this process is more fully described in U.S. Pat. No. 5,342,427, which is hereby incorporated by reference.

Exhaust gases are next directed to the electrostatic cullet bed filter 115 which is formed by cullet filling the space 120 between a confinement formed by concentric conduits having apertures or slots, such as the inner louvers 122 and outer louvers 123, both of which are electrically grounded. In this embodiment, the electrostatic cullet bed filter 115 and the preconditioning bed 105 are contiguous. This arrangement is advantageous in that it eliminates free fall of cullet from the preconditioning bed 105 to the electrostatic granular bed filter 115.

An electrode 125 is located concentrically between the louvers 122, 123 and is supported by ceramic insulator bushings 130. The electrode is perforated to allow exhaust gas to pass through it.

The electrostatic cullet bed filter 115 is designed for substantially lower gas velocity and substantially greater bed thickness than the preconditioning bed 105. Generally, the velocity will be from about 0.1 to 0.5 m/sec, and typically 0.2–0.4 m/sec. The thickness will be generally from about 400 to 1000 mm, and preferably from about 500 to 750 mm. Cullet flows through the electrostatic cullet bed filter from the preconditioning bed 105 and is discharged through the bottom hopper 140 to pipe 150. The flow rate is of such character that little or no generation of glass fines occurs. Generally, this is brought about by providing a sufficiently slow rate of movement of the cullet through the module. Cullet flow rate through the preconditioning step is such that free fall of cullet, and hence generation of fines is avoided. The cullet flow velocity in the electrostatic cullet bed filter 115 is much lower than through the first preconditioning bed 105.

The cullet temperature at its entry to the electrostatic cullet bed filter 115 is above the acid dew point of the exhaust gas (e.g., 150° C.), from its exposure to hot exhaust gases in the preconditioning bed 105. The cullet exiting temperature depends upon the cullet throughput and the exhaust gas heat content into the module, but will typically be in the range of from about 300° to about 450° C.

The electrode in the bed is connected to a power supply and thus polarizes the cullet pieces in the bed. The polarized cullet then attracts the electrostatically charged pollutant dust particles from the gas which become attached to the cullet pieces. It has been found that an electric field at least as low as $10^3$ volts per meter can be used. Cleaned gas collects in an outlet plenum 135 and exits the module through pipe 45. An example of this process is more fully described in U.S. Pat. No. 5,342,427, which is hereby incorporated by reference.

While the volatile products of pyrolysis are entrained in the gases exiting the dryer/pyrolyzer 30 through line 70, a solid carbon residue remains on the cullet after passage through the dryer/pyrolyzer 30 and is carried down into the electrostatic cullet bed filter 115 of the module. In the electrostatic cullet bed filter 115, this carbon residue is again contacted with relatively hot exhaust gases delivered from line 15. It has been found that this carbon residue eventually oxidizes into gaseous $CO_2$ and is carried out of the main filter module with the exhaust gas 45 and discharged to atmosphere. However, this pure carbon residue does not create any odor upon its oxidation.

It appears that a rather extended period of time is required for oxidation of this solid carbon residue, typically on the order of several hours. Since the residence time of the cullet in the dryer/pyrolyzer 30 is significantly less that this, usually less than one hour, the carbon cannot be oxidized in the dryer/pyrolyzer 30.

If the odor bearing gases withdrawn from the module in line 70, containing the volatile products of pyrolysis, are elevated in temperature in an environment with sufficient oxygen content and for a sufficient time, the odor causing substances will be oxidized to produce innocuous products of combustion such as $CO_2$ and $H_2O$. Simply passing these gases into a combustion chamber, and adding fuel and oxygen would eliminate the odors. However, such an approach is expensive to operate because of the cost of fuel required. Because the glass manufacturing process necessarily involves high temperature exhaust gases, it has been discovered that alternative arrangements described below provide a more economical system.

The apparatus as described above is capable of pretreating raw cullet comprising up to 100% ecological cullet. In general, the cullet, whether from a glass factory source or ecological sources, should have an average size of between about 1.0 mm and 50 mm, desirably between about 2 mm and 20 mm and preferably between about 4 mm and 10 mm. The cullet size will depend on a number of factors including the cullet type, desired throughout in the apparatus, and desired cullet flow rate.

Glass melting furnaces which utilize combustion of fossil fuels for heat generation are encountered in the industry in three basic types.

1. Regenerative furnaces wherein combustion air is preheated in periodically reversed brick matrix regenerators.
2. Recuperative furnaces wherein combustion air is preheated in metal recuperators, using waste gases from the furnace as the heat source.
3. Oxygen-fuel furnaces wherein relatively pure oxygen is used instead of air for combustion.

In each of these types, odor incineration can be integrated into the basic process without additional expenditure of energy.

Figure 2:
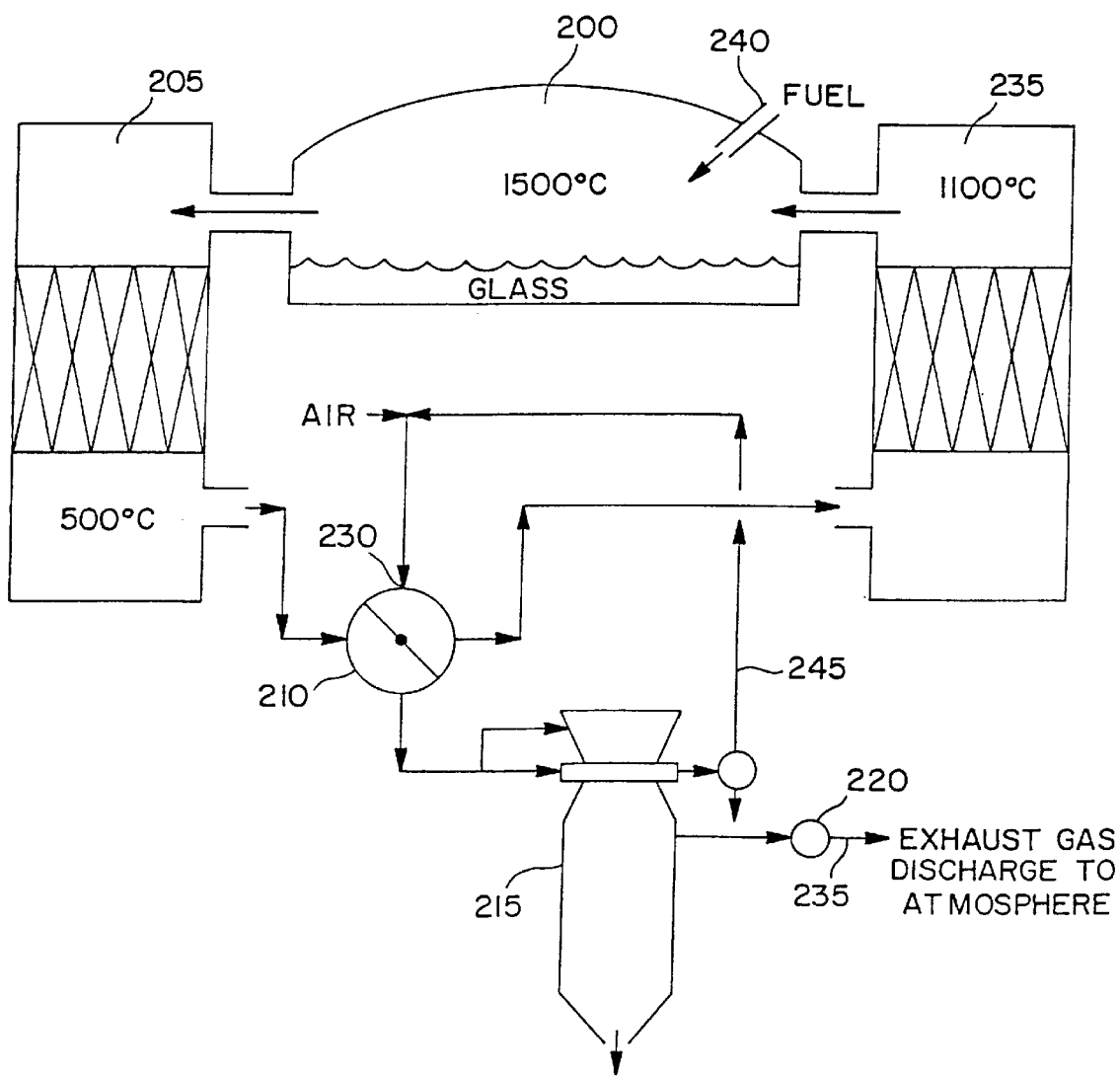
FIG. 2 illustrates a regenerative furnace equipped with two identical brick matrix regenerators and a vertically downward moving cullet bed with two horizontal gas flows therethrough.

Regenerative furnaces are equipped with two identical brick matrix regenerators for preheating of combustion air as shown in FIG. 2. Exhaust gases from the furnace 200 are drawn through the first regenerator 205 where they heat refractory bricks. The cooled gases exiting the regenerator pass through a reversing valve 210 where they are directed to the cullet preheat/filter module 215 as described earlier. They are drawn through the entire system by exhaust fan 220 and are discharged to the atmosphere through line 225.

Air for combustion is first drawn through the port 230 of reversing valve 210, then passed through the second regenerator 235. Air is heated by contact with the hot bricks in the regenerator and is then passed on to the furnace where fuel 240 is mixed with the preheated air and combusted. Periodically, typically every 20 minutes, the reversing valve is actuated which reverses the air and gas flow directions through the regenerators and switching the functions of the two regenerators.

Off-gases 245 from the dryer/pyrolyzer are directed back and mixed with the incoming air to the reversing valve. By doing so, the mixture of air and odor bearing gases travel through one regenerator, are mixed with fuel, and are combusted in the glass furnace 200. In the glass furnace 200, temperatures are typically 1500° C., so incineration of the odorous substances is assured.

Figure 3:
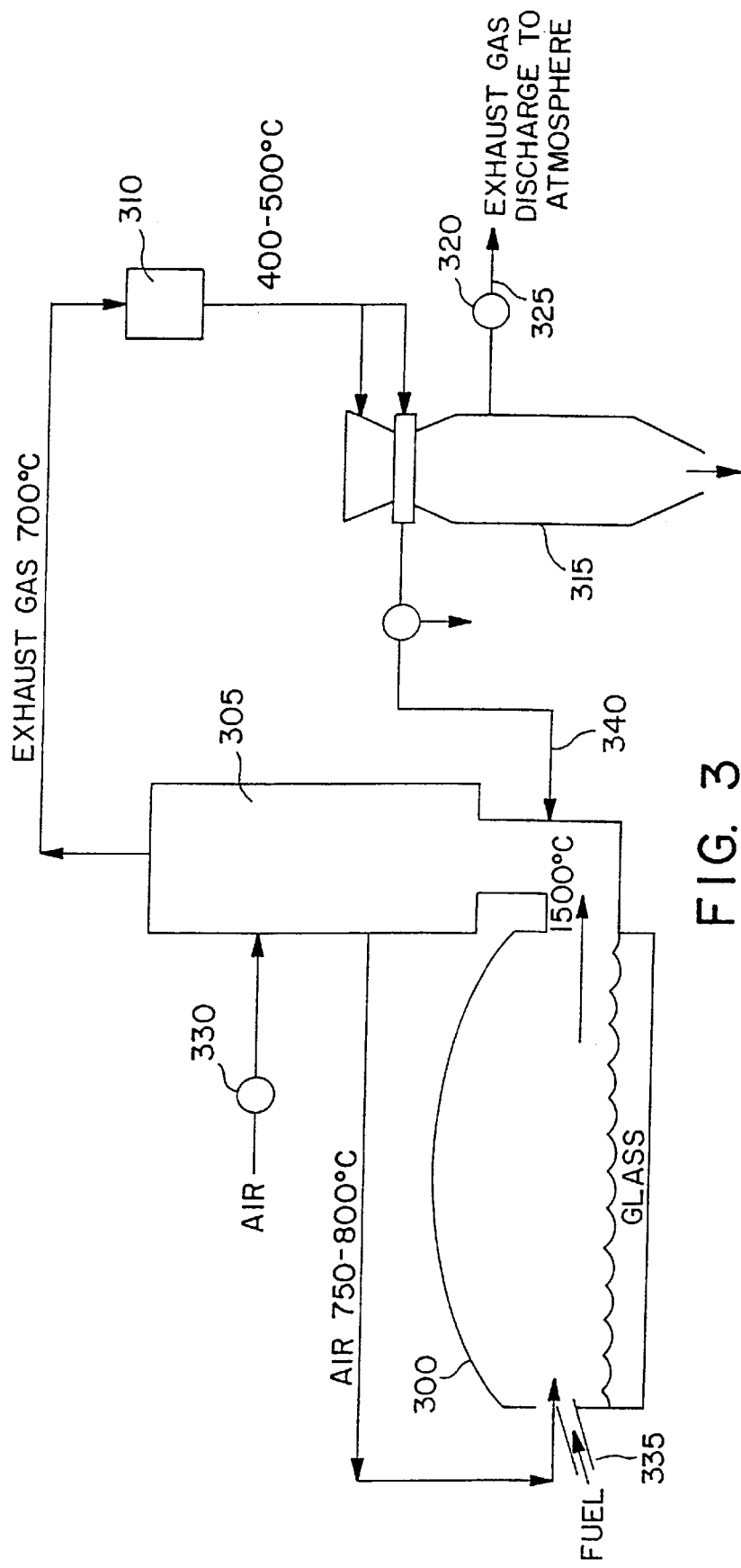
FIG. 3 illustrates a recuperative furnace equipped with a recuperator and a vertically downward moving cullet bed with two horizontal gas flows therethrough.

Recuperative furnaces, as shown in FIG. 3, utilize a metallic gas-to-air heat exchanger to preheat combustion air with exhaust gases. Exhaust gases leave the furnace 300 and are passed through recuperator 305 where they are cooled to about 700° C. Typically, these gases are further cooled to about 400°–500° C. in cooler 310 which is typically a water evaporative type. Cooled gases are then drawn through the cullet preheat/filtering module 315 by exhaust fan 320 and discharged to atmosphere through line 325.

Air is supplied to the recuperator 305 by combustion air fan 330 where it is preheated to about 750°–800° C. Hot air from the recuperator is mixed with fuel 335 in burner 300 which discharges into the furnace, It is not possible to mix off-gases from the preheat/filtering module 315 directly with the combustion air (as with regenerative furnaces) because the air must pass through relatively small openings inside of the recuperator. Dust contaminants in the pyrolyzer off-gases would quickly foul the recuperator internals. Instead, pyrolyzer off-gases 340 are mixed with exhaust gases from the furnace before these gases pass through the recuperator 305. At this point, the exhaust gases are at about 1500° C. and the mixture temperature is still sufficiently high to completely incinerate the odorous substances in the off-gases.

Figure 4:
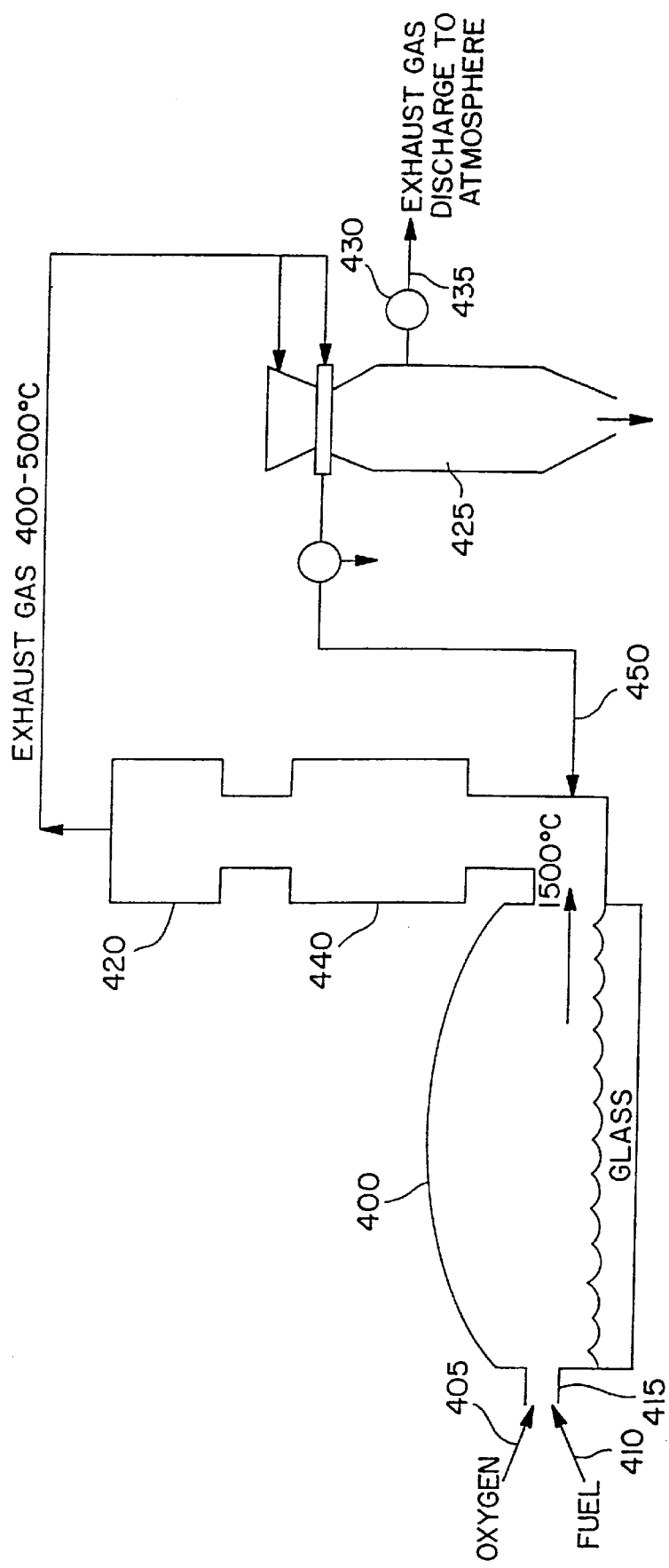
FIG. 4 illustrates an oxygen fuel furnace equipped with an oxygen burner and a vertically downward moving cullet bed with horizontal gas flow therethrough.

Oxygen-fuel furnaces, as shown in FIG. 4, have recently come into usage in the glass industry. Relatively pure oxygen 405 is mixed with fuel 410 in burner 415 which discharges into furnace 400, thus providing heat for glass melting. It has not yet been demonstrated that either oxygen or fuel can be preheated utilizing exhaust gases in order to improve efficiency. Exhaust gases are discharged from the furnace at about 1500° C.

Exhaust gases are cooled in cooler 420 which is typically accomplished by dilution with ambient air. Dilution with air is utilized because exhaust gases from oxygen-fuel furnaces have about one quarter the mass flow rate compared to conventional furnaces and have a very high moisture content, thus precluding the use of water evaporation. The resulting 400°–500° C. exhaust gases are drawn through the cullet preheat/filtering module 425 by exhaust fan 430 and are discharged to atmosphere through line 435.

Pyrolyzer off-gases are mixed with furnace exhaust gases at the bottom of an incineration chamber 440. The mixture of these two gas streams still has sufficiently high temperature so that all the odorous substances will be incinerated, but it is important to provide sufficient residence time prior to the subsequent cooling of the gases. The exact amount of residence time necessary to fully combust the odorous substances is dependent on the temperature, oxygen content and chemical makeup of the substances, but it has been found that with a minimum temperature of 800° C., minimum oxygen content of 4% and residence time of 1 sec, good performance is achieved.

Under many conditions, especially with high throughputs of cullet, the return of relatively large volumes of off-gases from the pyrolyzer to the various points in the glass furnace as previously described, can have deleterious effects on the overall process. For example, with recuperative furnaces, the mixture of hot exhaust gases from the furnace and cool pyrolyzer off-gases can have a temperature too low for effective combustion air preheating in the recuperator. In regenerative furnaces, the return of relatively large volumes of pyrolyzer off-gases mixed with combustion air can reduce the oxygen content of the combustion air which can in turn have adverse effects on fuel combustion inside the furnace. In general it will be advantageous to the overall process to reduce the volume of off-gases from the dryer/pyrolyzer 450 to as low as possible.

One method of reducing off-gases is to minimize the amount of gas introduced into the dryer/pyrolyzer. Referring again to FIG, 1, the amount of gases introduced at 20 is desirably 25% or less, more desirably 10% or less, even more desirably 5% or less of the main gas flow 5.

While the above-described general methods of odor elimination may be used successfully, the utilization of any of alternate arrangements can prove to be more economical in operation of the overall glass manufacturing process. Various alternate arrangements are discussed below.

Figure 5:
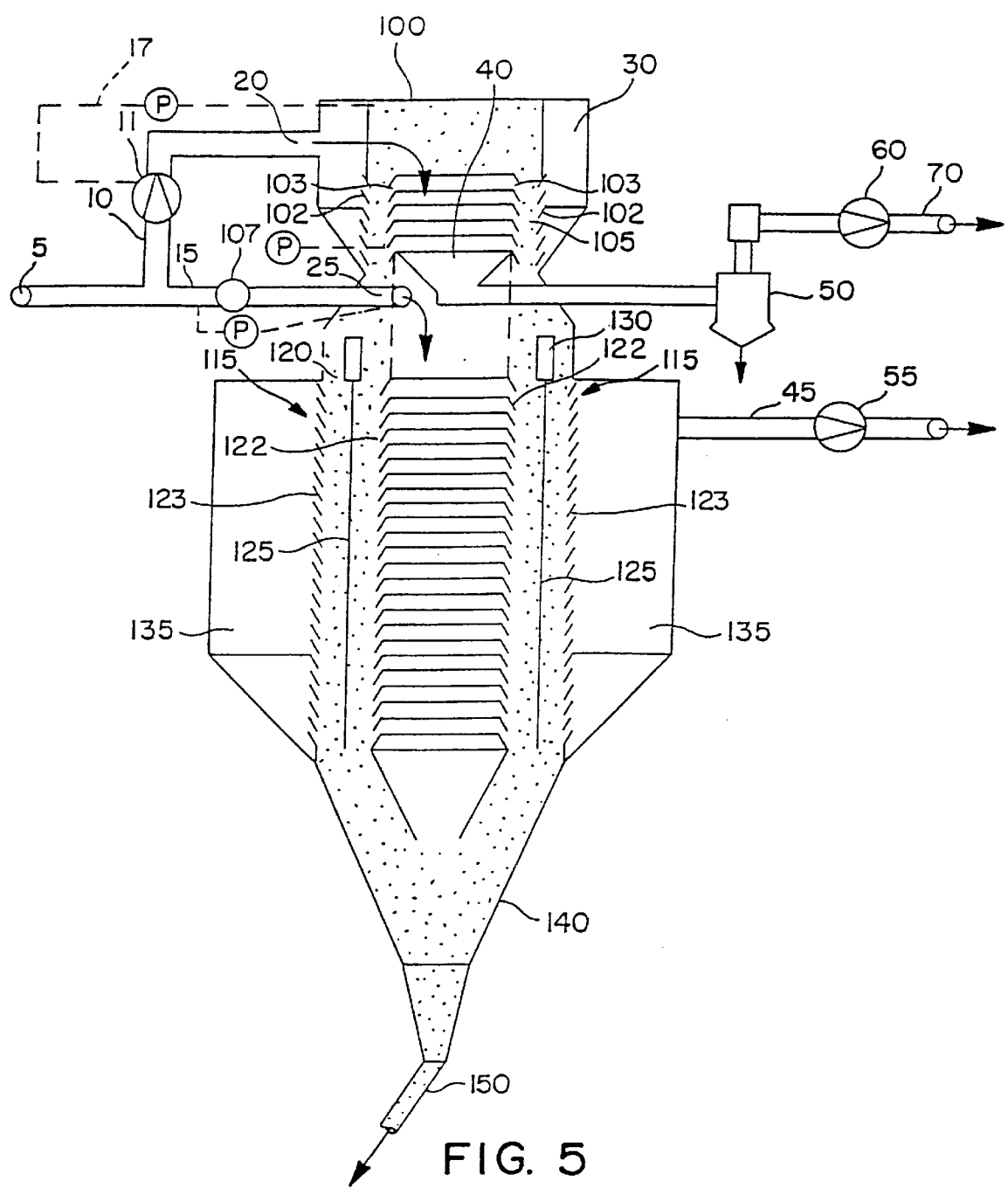
FIG. 5 illustrates another vertically downward moving cullet bed with horizontal gas float therethrough.

FIG. 5 is FIG. 1 with additional details pertinent to the following detail descriptions. It is useful to define the following parameters for further analysis:

| | | |
|---|---|---|
| $M_{pg}$ = | mass flow rate of gases into dryer/pyrolyzer | (kg/h) |
| $M_c$ = | mass flow rate of cullet | (kg/h) |
| $C_{pg}$ = | specific heat capacity of gases | (kJ/kg-°K.) |
| $C_{pc}$ = | specific heat capacity of cullet | (kJ/kg-°K.) |
| $T_{gi}$ = | gas temperature into dryer/pyrolyzer | (°K.) |
| $T_{go}$ = | gas termperature out of dryer/pyrolyzer | (°K.) |
| $T_{ci}$ = | cullet temperature into dryer/pyrolyzer | (°K.) |
| $T_{co}$ = | cullet temperature out of dryer/pyrolyzer | (°K.) |

Process control may be accomplished by controlling fume fan 60 to run at speed so that the heat flux of gases matches the desired heat flux to the cullet through the dryer/pyrolyzer 30, That is:

$M_{pg} \times C_{pg} \times [T_{gi} - T_{go}] = M_c \times C_{pc} \times [T_{co} - T_{ci}]$. In this way, the volume of gases passing through the dryer/pyrolyzer 30 will be minimized, but still adequate to transfer virtually all of their available heat to the cullet. The cullet inlet temperature is desirably ambient (20° C.) (note: °K=273+°C.) and the cullet outlet temperature from dryer/pyrolyzer 30 will desirably be the minimum sufficient to pyrolyze the odor causing substances, typically 150°–250° C. Cpg is typically 1.44 kJ/kg-°K. and Cpc is typically 1.17 kJ/kg-°K. Other parameters will depend upon the specific application.

Dryer/pyrolyzer fan 11 will have its speed controlled by feedback 17 from static pressure inside the cullet infeed hopper 100. This static pressure will be controlled to be just +/−0. The cullet infeed hopper 100 is desirably of open design to permit frequent filling with raw cullet. If this pressure becomes positive, odorous fumes released from the cullet will vent upward through the hopper 100 and be released to the atmosphere. If this pressure becomes negative, cold tramp air will be drawn into the system, mixed with the pyrolyzer off-gases, and unnecessarily increase the volume of pyrolyzer off-gases which must be incinerated. A fan speed controller may be set up so that if the static pressure increases (becomes positive), the fan will slow down, If the static pressure decreases (becomes negative), the fan will speed up.

It is preferred for the dryer/pyrolyzer 30 to be operated so that the static pressure in the cullet infeed hopper is nearly 0. By symmetry, the static pressure inside the cullet bed just below the pyrolyzer will also be nearly 0. Because this cullet region is contiguous between the dryer/pyrolyzer 30 and the main filter module 115, there exists the possibility of gas flow through the cullet in the connecting areas. If the main filter 115 is at an under pressure (which is the normal case due to the exhaust fan 55), it will have a tendency to pull dryer/pyrolyzer 30 off-gases down through the cullet and into the main gas flow through line 45. This would result in odorous substances being emitted to atmosphere, which is not desirable.

Typically the inlet exhaust gases 5 are at nearly 0 static pressure. Provisions are made so that a portion of the inlet exhaust gases 15 are directed into the cullet which fills the region between the dryer/pyrolyzer 30 and the main filter module 115. This may be done in several equivalent locations around the circumference, In the case where the inlet gas stream is not at essentially 0 static pressure, a fan 107 may be provided so that the static pressure inside the dryer/pyrolyzer 30 is essentially 0. With, such an arrangement, there will be no tendency of odorous gases to leave the pyrolyzer and flow to the main exhaust gas stream in line 45. Neither will there be a tendency for gases from the main exhaust stream to be drawn into the pyrolyzer off-gases. There will be a tendency for a portion of the inlet gases directed through the dryer/pyrolyzer 30 to be pass downward through the cutlet above the main filter 115, but they will be recombined with the main gas flow in the main filter 115 with no adverse effects on the system.

If cullet is heated to excessively high temperatures, it will soften and can fuse together. As a result, it has been found that the inlet gas temperature to the dryer/pyrolyzer 30 and the main filter module 115 must be limited to a maximum of between 500° and 600° C. Additionally, the effectiveness of the system as a filter for dust depends upon the inlet temperature. As temperature increases, both the ionizer and polarization voltages are reduced due to electrical conductivity limitations. Both these effects reduce the system's efficiency for capturing dust. These effects may necessitate the use of various schemes of gas cooling prior to the module if the gas temperatures exceed the maximum practical operating limit.

Figure 6:
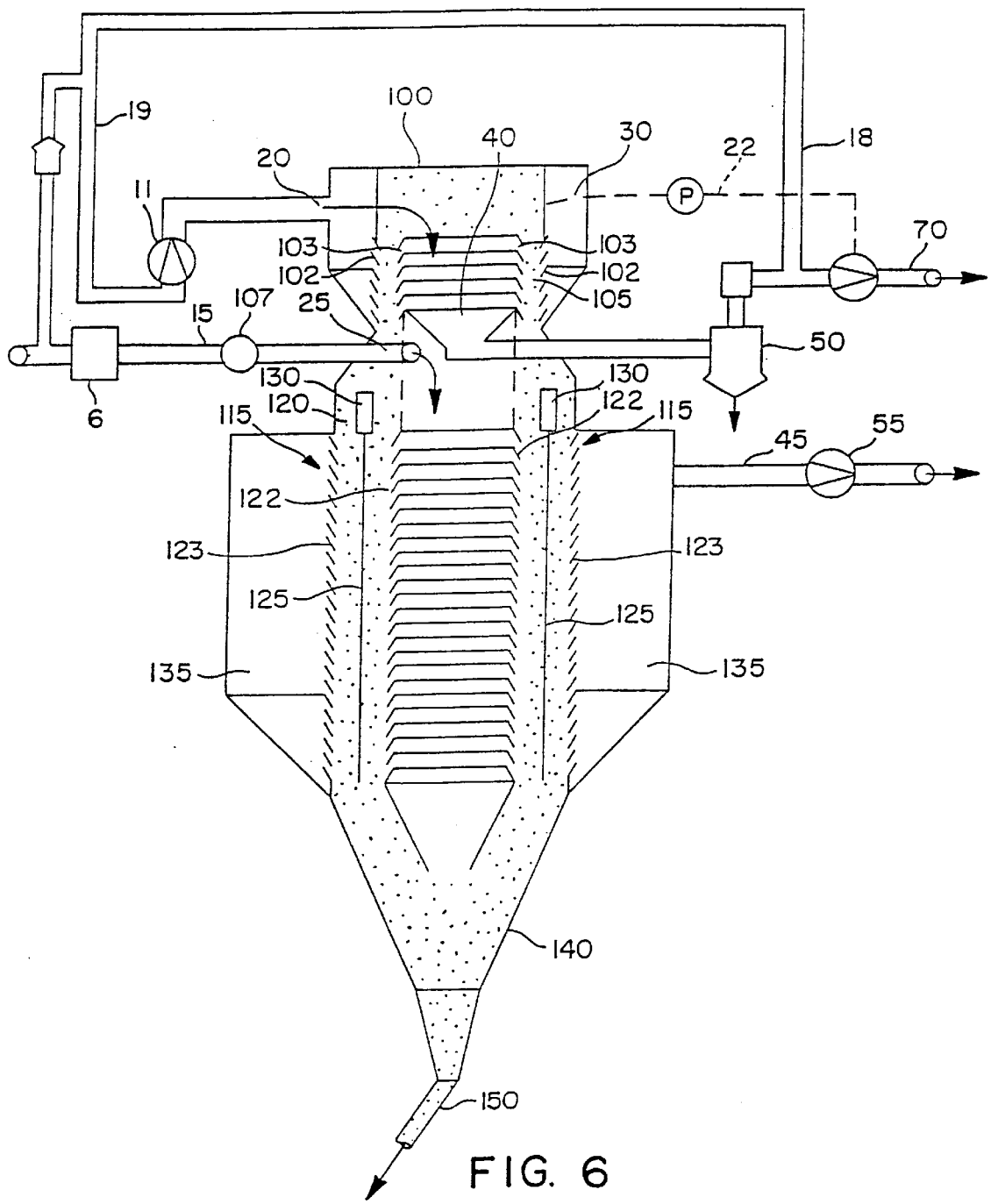
FIG. 6 illustrates another vertically downward moving cullet bed with horizontal gas flow therethrough.

FIG. 6 is FIG. 1 with additional details regarding temperature control of the inlet gases. As shown in FIG. 6, if the limitation on gas inlet temperature is lower than the available exhaust gas temperature, the hot gases 5 may be passed through a cooler 6 to reduce the gas temperature.

It is also possible to reduce exhaust gas temperature introduced to the dryer/pyrolyzer 30 by utilizing pyrolyzer off-gases leaving cyclone 50. One portion of the off-gases 70 leaving the cyclone 50 may be discharged into the incineration region as discussed above. Another portion 18 may be mixed with a portion of the hot gases 10 to form a mixed gas stream which is drawn into the pyrolyzer fan 11 and discharged into the dryer/pyrolyzer 30. By mixing the portion 18, which is at a reduced temperature, with the hot gas 10, the temperature of the gas introduced in the dryer/pyrolyzer 30 may be reduced. Depending upon the temperatures of the cooled pyrolyzer off-gases, the hot gases, and the maximum temperature tolerated by the cullet, the volume of pyrolyzer off-gases discharged into the incineration region can be as low as 20%, but typically about 50%, of the volume required in the simplest arrangement described earlier.

When recirculating dryer/pyrolyzer exhaust gas 18, process control will be different to that previously described. Pyrolyzer fan 11 will be run at a speed so hat the heat flux of gases match the desired heat flux to the cullet through the dryer/pyrolyzer. This is:

Mpg×Cpg×[Tgi−Tgo]=Mc×Cpc×[Tco−Tci]. In this way, the volume of gases passing through the dryer/pyrolyzer 30 will be minimized, but still adequate to transfer virtually all of their available heat to the cullet. Further, the cullet inlet temperature and the cullet outlet temperature will be the minimum sufficient to pyrolyze the odor causing substances.

Further, a throttling valve 7 may be used to control the temperature of mixed gases 19 and fume fan 60 may have its speed controlled by feedback from static pressure 22 inside the cullet inf ed hopper. This static pressure will be controlled to be just +/−0, for the reasons described above. Fume fan 60 speed and throttling valve 17 may be automatically controlled by feedback loops from their respective control parameters, so their control will be simultaneous of course, any one or more of the above temperature control devices may be used alone or in combination with another temperature control device to achieve the desired result.

Although the present invention has been described in connection with preferred embodiments of the invention, it will be appreciated by those skilled in the art that additions, substitutions, modifications and deletions not specifically described, may be made without departing from the spirit and scope of the invention as defined in the appended claims.

What is claimed is:

1. An apparatus for treating cullet before use as a raw material in glass manufacturing process comprising:
   a) a housing comprising an outer conduit and an inner conduit each of which contains apertures along its length and between which is confined a moving bed of cullet,
   b) a source of hot gases,
   c) means of moving the hot gases so that they pass through apertures of the outer conduit, the moving bed of cullet, and the apertures of the inner conduit to pyrolyze odor creating impurities within the cullet and entrain volatile products of pyrolysis into gases leaving the moving bed and d) an incinerator to remove odor creating impurities from gases leaving the moving bed.

2. The apparatus of according to claim 1, wherein the outer and inner conduits are of circular cross section and are concentric.

3. The apparatus of according to claim 1, wherein the apertures are louvers.

4. The apparatus according to claim 1, wherein the incinerator a) mixes the gases leaving the bed with combustion air and b) introduces the mixture into a glass furnace along with fuel to create combustion of the fuel and incineration of the odor creating impurities.

5. The apparatus according to claim 1, further comprising a device which mixes a portion of said gases leaving the bed with hot furnace exhaust gases and introduces the mixed gases into the housing.

* * * * *

UNITED STATES PATENT AND TRADEMARK OFFICE
CERTIFICATE OF CORRECTION

PATENT NO.    :   5,773,529

DATED         :   June 30, 1998

INVENTOR(S)   :   Jeffrey C. ALEXANDER

It is certified that error appears in the above-identified patent and that said Letters Patent is hereby corrected as shown below:

On the title page, item [73] should read

Assignee: please delete "Sandvik AB, Sandviken, Sweden" and insert therefor -- Edmeston AB, Västra Frölunda, Sweden--.

Signed and Sealed this

Thirteenth Day of July, 1999

*Attest:*

Q. TODD DICKINSON

*Attesting Officer*          *Acting Commissioner of Patents and Trademarks*